April 24, 1951 M. G. BURWELL 2,549,755
BURNER BASE FOR HOT-WATER TANKS
Filed April 24, 1947

INVENTOR.
Maurel G. Burwell
BY W. S. McDowell
ATTORNEY.

Patented Apr. 24, 1951

2,549,755

UNITED STATES PATENT OFFICE 2,549,755

BURNER BASE FOR HOT-WATER TANKS

Maurel G. Burwell, Columbus, Ohio

Application April 24, 1947, Serial No. 743,547

2 Claims. (Cl. 122—183)

The present invention deals with liquid heating apparatus, and has particular reference to a heater base upon which a hot water tank is positioned, and is afforded direct heat for the purpose of elevating the temperature of water or other liquids contained therein.

The primary object of the invention is to provide a base structure, including a fuel burner, which is adapted to receive and support a hot water tank of the type embodying a laterally offset side-arm heating coil which in normal operation serves to supply heat by convection flow to the liquid contained within the tank.

It is another object of this invention to provide a burner mechanism for hot water tanks which is adapted to heat both the bottom of the associated tank, and the side arm coil thereof, in order to more efficiently utilize the heat given off from a quantity of fuel, and to quickly and efficiently heat a body of water contained within the associated hot water tank.

It is still a further object of this invention to provide a mechanism of the type described which is structurally simple, and is composed of relatively few and simple replaceable parts, thereby permitting the device to be installed in a quick and facile manner upon the ordinary type of hot water tank.

For a further understanding of the present invention reference is made to the following description and accompanying drawing wherein.

Figure 1:
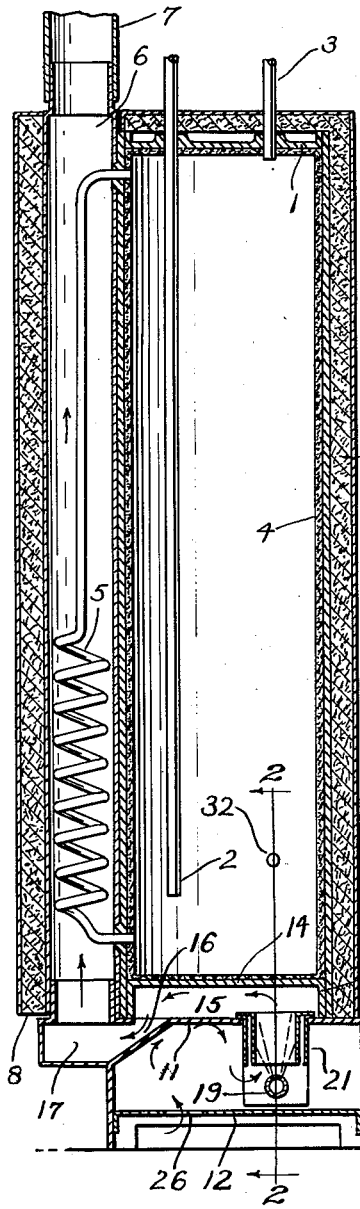
Fig. 1 is a transverse vertical sectional view taken through an improved liquid heating assembly formed in accordance with the present invention.
Figure 3:
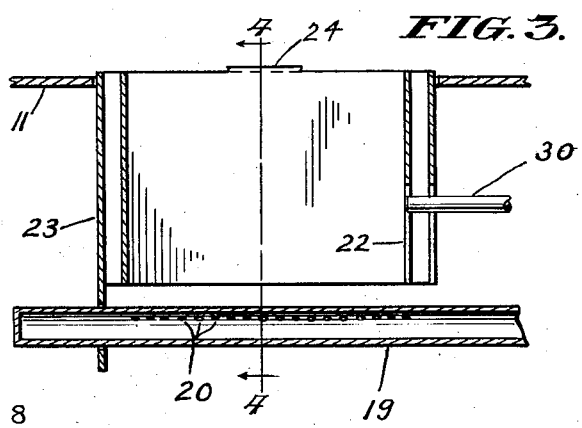
Fig. 3 is an enlarged vertical sectional view taken through the fuel burner and its associated flame box which form an integral part of the base structure.
Figure 2:
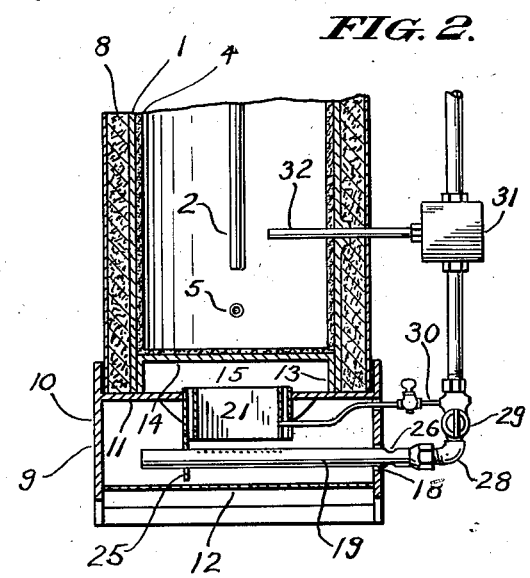
Fig. 2 is a vertical sectional view taken along the line 2—2 of Fig. 1.
Figure 4:
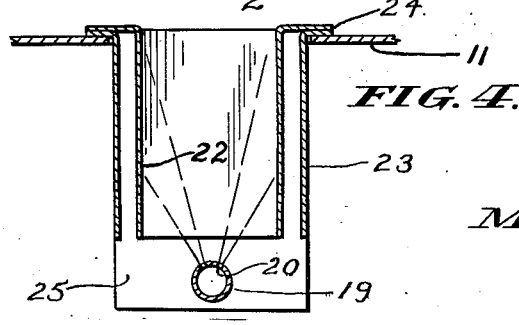
Fig. 4 is a transverse vertical sectional view taken along the line 4—4 of Fig. 3.

Referring now to the drawing and to the single illustrative embodiment of the present invention disclosed therein, the numeral 1 refers to a substantially cylindrical hot water tank of any suitable size, and having introduced therein a water-supplying inlet 2 and a discharge outlet 3. These members are disposed in the normal manner within the tank whereby cold water is introduced at the lower end of the tank and heated water withdrawn substantially from the upper portion thereof. Preferably, the inner surface of the tank is lined with a ceramic material 4, which prevents rusting of the tank, when the same is formed from a metallic material, and the consequent discoloration and contamination of the water contained therein. In the usual manner, the tank is provided with a side arm heating coil 5 having its ends communicating respectively with the lower and upper region of the tank interior. Disposed adjacent the tank, in vertical alignment therewith and surrounding the side arm coil 5, is a substantially circular flue 6 which functions to direct the heated gaseous products of combustion from the burner upwardly to ultimately be discharged through a suitable stack 7. Encasing both the tank 1 and the associated flue 6 is a jacket of insulating material 8 which serves to protect the tank against undue heat loss.

Disposed below the tank 1 and the flue 6, and supporting the former is a substantially cylindrical base generally designated by the numeral 9. More specifically, the base 9 comprises a circular side wall 10, and vertically spaced upper and lower walls 11 and 12 respectively. The upper wall 11 of the base 9 provides a shelf upon which the bottom flange 13 of the tank rests, and defines with the bottom wall 14 of the tank a heating chamber 15 disposed in direct contact with the bottom of the tank. At one side, the upper wall 11 of the base is cut away as at 16 to provide a passageway leading from one corner of the chamber 15 to a laterally offset exhaust chamber 17. The upper end of the exhaust chamber 17 is provided with a stub-conduit adapted to fit within the lower end of the flue 6 which extends longitudinally of the tank 1.

Figure 5:
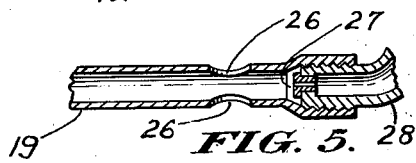
Fig. 5 is a fragmentary vertical sectional view of the fuel burner.

Extending inwardly of the base through an opening 18 formed in the side wall thereof, and disposed between the upper and lower walls, is a tubular gas burner 19 which is provided substantially at its outer end with a plurality of flame orifices 20. Disposed directly above and in vertical registration with the flame orifices 20 of the burner 19, is a flame box 21 which is adapted to direct the flame issuing from the burner 19 upwardly into the heating chamber 15 disposed below the bottom of the tank 1. The flame box 21 is formed in a generally prismatic or cylindrical configuration, and is provided with spaced inner and outer walls 22 and 23 respectively, these walls being integrally joined by integrally formed and spaced webs 24, which are flanged at their upper ends to provide a lip from which the box is suspended within an opening formed in the upper wall 11 of the base. The outer wall 23 of the box is extended on one of its sides to provide a dependent flange 25 in which is formed an opening adapted to receive the outer end of the gas burner 19, in order to support the same in a relatively fixed position with respect to the box. Referring to Fig. 1 of the drawing, it will be seen that the lower wall 12 of the base is provided with an opening 26 through which atmospheric air may pass inwardly of the chamber formed between the upper and lower walls. This opening 26 provides sufficient draft to direct the flame issuing from the burner 19 upwardly of the flame box and into the heating chamber 15 formed between the lower portion of the tank and the upper wall of the base, and to ultimately direct the gaseous products of combustion upwardly through the flue 6 and around the heater coil 5, as indicated by arrows in Fig. 1. The space between the inner and outer walls 22 and 23 of the flame box 21, provides a passageway through which atmospheric air present within the chamber of the base may pass to insure complete combustion of the fuel within the heating chamber 15. Also, the air in passing through this passageway will be pre-heated by striking the inner walls of the flame box, and upon passage to the heating chamber 15 will create a draft around the open flame port of the box thereby directing the flame issuing therefrom laterally through the heating chamber and downwardly through the passageway 16 into the lower end of the flue 6. Referring particularly to Fig. 5 of the drawings, it will be seen that the initial mixture of air with the gaseous fuel is accomplished exteriorly of the base by means of air intake openings 26 formed in the breech end of the tubular burner 19.

In a preferred form, the burner head 19 is connected at its breech end with a gas-ejecting nozzle 27 disposed at the end of a gas supplying conduit 28. The conduit 28 may advantageously be provided with a manually controlled shut off valve 29, and may be tapped and provided with a pilot conduit 30 which is introduced interiorly of the base through the side wall thereof, and directed to the flame box 21 to provide a constant pilot light for the main burner 19. Also, the main gas conduit 28 is provided with a thermostatically operated gas valve 31, having a heat responsive element 32 extending internally of the tank 1 at any suitable location therein.

In operation, the base 2 functions to provide a support for the associated hot water tank, and the upper wall thereof forms a chamber with the bottom of the tank adapted to directly receive the flame from the gas burner 19 to supply heat to the bottom of the tank and to the water contained therein. In addition to this direct contact by the flame, the heat emanating from the hot gaseous products of combustion ultimately passes from the heating chamber 15 by way of the laterally offset exhaust chamber 17 into the bottom of the associated flue 6 which contains the spirally wound side arm coils 5, and additional heat is transferred to the liquid through this coil.

In view of the foregoing it will be seen that the present invention provides both a useful and mechanically efficient heat transfer device for hot water heating systems, and is readily adaptable for use with presently known and used hot water tanks having the ordinary side arm heating coil. Further, by nature of its construction the base may be readily assembled or disassembled according to the needs of the user and requirements of repair. The invention is further characterized by its structural simplicity, its economy of maintenance and manufacture, and its ease of installation.

I claim:

1. A burner base for a hot water tank of the type having a side arm heat-transfer coil carried within a chamber disposed adjacent the tank and side flanges extending beyond the bottom of the tank, said base comprising an upstanding side wall; a top wall extending perpendicularly to said side wall a distance below the upper edge thereof, said side wall and top wall defining an open chamber for the reception of the bottom side flanges of the tank; a bottom wall having an air intake opening therein and carried by said side wall in spaced relation to said top wall and defining with said side and top walls a substantially enclosed mixing chamber; a gaseous fuel burner extending through said side wall and into said mixing chamber; a fire box depending from said top wall directly above said burner for directing a flame issuing from said burner from said mixing chamber to the bottom of a tank received within the open chamber defined by said side wall and top wall; and means defining a flue passage in said base and communicating, respectively, with said open chamber and the chamber in which the heat-transfer coil of said tank is carried, whereby gaseous products of combustion emanating from said burner may be directed from the bottom of said tank to the heat-transfer coil thereof.

2. Liquid-heating apparatus comprising a vertically arranged tank having a laterally offset side arm heat-transfer coil and a bottom wall bounded by a depending marginal edge flange; a base supporting said tank and formed with an upstanding side wall telescoping about the depending marginal edge flange of said tank and a horizontally disposed top wall arranged intermediate the ends of the side wall and supporting the margin edge flange of said tank, the top wall of said base defining with the bottom wall and depending marginal edge flange of said tank a substantially enclosed heating chamber, said top wall being formed with a flame port; a fuel burner positioned below the top wall of said base in alignment with the flame port formed in said top wall; a vertically arranged open-ended conduit depending from the top wall of said base directly above said fuel burner for directing flames issuing from said fuel burner to said heating chamber; an upwardly opening flue pipe connection formed on said base in laterally offset relation to said tank, said base being formed with a passageway extending from the top wall thereof to said flue pipe connection for conducting gaseous products of combustion emanating from said burner and introduced within said heating chamber to said flue pipe connection; and a vertically arranged flue pipe communicating at its lower end with the flue pipe connection of said base and enclosing the side arm heat transfer coil of said tank for conducting gaseous products of combustion emanating from said burner away from said base and in heat-transfer relation to the side arm coil of said tank.

MAUREL G. BURWELL.

REFERENCES CITED

The following references are of record in the file of this patent:

UNITED STATES PATENTS

| Number | Name | Date |
|---|---|---|
| 315,713 | Bunker | Apr. 14, 1885 |
| 1,150,948 | Laziny | Aug. 24, 1915 |
| 2,029,337 | Parker | Feb. 4, 1936 |
| 2,041,683 | Ames | May 26, 1936 |
| 2,102,800 | Killmeyer | Dec. 21, 1937 |
| 2,126,969 | Morrow | Aug. 16, 1938 |
| 2,356,657 | Davis | Aug. 22, 1944 |
| 2,414,875 | Horne | Jan. 28, 1947 |

FOREIGN PATENTS

| Number | Country | Date |
|---|---|---|
| 108,703 | Australia | Oct. 19, 1939 |